United States Patent
Yang

(10) Patent No.: US 9,654,526 B2
(45) Date of Patent: May 16, 2017

(54) REAL-TIME STREAMING MEDIA PLAYING METHOD AND REAL-TIME STREAMING MEDIA PLAYING SYSTEM

(71) Applicant: Primax Electronics Ltd., Neihu, Taipei (TW)

(72) Inventor: Jung-Chang Yang, Taipei (TW)

(73) Assignee: PRIMAX ELECTRONICS LTD., Taipei (TW)

(*) Notice: Subject to any disclaimer, the term of this patent is extended or adjusted under 35 U.S.C. 154(b) by 521 days.

(21) Appl. No.: 14/225,024

(22) Filed: Mar. 25, 2014

(65) Prior Publication Data
US 2015/0200989 A1   Jul. 16, 2015

(30) Foreign Application Priority Data

Jan. 10, 2014   (TW) .............................. 103100990 A

(51) Int. Cl.
| | |
|---|---|
| G06F 15/16 | (2006.01) |
| G06F 17/30 | (2006.01) |
| H04L 29/06 | (2006.01) |
| H04L 12/28 | (2006.01) |

(52) U.S. Cl.
CPC ...... *H04L 65/4084* (2013.01); *H04L 12/2812* (2013.01); *H04L 12/2825* (2013.01); *H04L 2012/2849* (2013.01)

(58) Field of Classification Search
CPC ......... G06F 15/16; G06F 17/30; G06E 17/00; G10L 19/00; H04N 21/27
USPC ......................................................... 709/219
See application file for complete search history.

(56) References Cited

U.S. PATENT DOCUMENTS

| | | | |
|---|---|---|---|
| 6,879,865 B1* | 4/2005 | Gladwin ................... | G06F 3/16 369/29.02 |
| 8,954,448 B1* | 2/2015 | Durham ............ | G06F 17/30029 707/723 |
| 2009/0055195 A1* | 2/2009 | Karlsgodt .............. | H04H 20/82 704/500 |
| 2011/0270955 A1* | 11/2011 | Baldini .................. | H04N 5/775 709/219 |
| 2013/0326567 A1* | 12/2013 | Park ................. | H04N 21/43615 725/82 |
| 2014/0143241 A1* | 5/2014 | Barello ............... | G06F 17/3089 707/724 |

* cited by examiner

*Primary Examiner* — Tonia L Dollinger
*Assistant Examiner* — Kishin G Belani
(74) *Attorney, Agent, or Firm* — Kirton McConkie; Evan R. Witt

(57) ABSTRACT

A real-time streaming media playing method is provided. Firstly, plural type data, plural internet radio station data and plural address data from an internet server are stored into a digital media server. Then, an active control device is connected to the digital media server. Consequently, a playing list containing the plural internet radio station data of the internet server and plural address path data corresponding to the plural address data is generated. According to the playing list, the plural address data are acquired by the active control device or a digital media renderer. According to the plural address data, a corresponding real-time streaming media file is played by the active control device or the digital media renderer.

12 Claims, 12 Drawing Sheets

MD

| | Name | Identity | Kinship | Character | |
|---|---|---|---|---|---|
| Type data | G1 | 1 | 0 | Internet server | Ig1 |
| | G2 | 2 | 0 | Internet server | Ig2 |
| | ⋮ | ⋮ | ⋮ | ⋮ | |
| | Gn | n | 0 | Internet server | Ign |
| Internet radio station data | R11 | 11 | 1 | Internet server | Ir11 |
| | R12 | 12 | 1 | Internet server | Ir12 |
| | ⋮ | ⋮ | ⋮ | ⋮ | |
| | R21 | 21 | 2 | Internet server | Ir21 |
| | ⋮ | ⋮ | ⋮ | ⋮ | |
| | Rnx | nx | n | Internet server | Irnx |

FIG.11

REAL-TIME STREAMING MEDIA PLAYING METHOD AND REAL-TIME STREAMING MEDIA PLAYING SYSTEM

FIELD OF THE INVENTION

The present invention relates to a real-time streaming media playing method, and more particularly to a real-time streaming media playing method for playing a real-time streaming media file in an area network group.

BACKGROUND OF THE INVENTION

Generally, an area network group comprises a local area network (LAN), a metropolitan area network (MAN) and a wide area network (WAN). With increasing development of science and technology, the area network group further comprises a universal plug and play (UPnP) system and a Digital Living Network Alliance (DLNA) system. For example, the DLNA system is an alliance organization that is composed by the manufacturers of consumer electronics products, mobile phones and computers. The DLNA is responsible for defining unified transmission specifications to allow a variety of products from different manufacturers to be connected and communicated with each other. Consequently, a first electronic device and a second electronic device that comply with the DLNA protocol can be in direct communication with each other in order to transfer data or make synchronization actions.

First of all, some architectures of the DLNA system will be illustrated as follows. FIG. 1 schematically illustrates the architecture of a first conventional DLNA system. As shown in FIG. 1, the first conventional DLNA system 1 comprises a network router 10, a digital media server (DMS) 11, and a digital media player (DMP) 12. The network router 10 is connected to an internet (not shown). In addition, the network router 10 is in communication with the digital media server 11 and the digital media player 12. Consequently, the communication between the digital media server 11 and the digital media player 12 is established through the network router 10. The digital media server 11 comprises a first storage element 111 for storing a media file 15. The media file 15 is for example an audio file, a photo file or a video file. After the digital media player 12 is in communication with the digital media server 11, the digital media player 12 may search the media file 15 from the digital media server 11. After the media file 15 is selected by the user through the digital media player 12, the media file 15 is transmitted from the digital media server 11 to a second storage element 121 of the digital media player 12. After the media file 15 is received by the digital media player 12, the media file 15 that is temporarily stored into the second storage element 121 can be played by the digital media player 12.

FIG. 2 schematically illustrates the architecture of a second conventional DLNA system. As shown in FIG. 2, the second conventional DLNA system 2 comprises a network router 20, a digital media server (DMS) 21, and a digital media renderer (DMR) 23. The communication between the digital media server 21 and the digital media renderer 23 is established through the network router 20. Similarly, the digital media server 21 comprises a first storage element 211 for storing a media file 25. In addition, the digital media server 21 further provides a control function of controlling operations of the digital media renderer 23. The digital media renderer 23 is used for receiving and playing the media file 25 that is transmitted from the digital media server 21. After the control function of the digital media server 21 is utilized to select the stored media file 25 from the digital media server 21, the media file 25 is transmitted from the digital media server 21 to the digital media renderer 23. Consequently, the media file 25 can be played by the digital media renderer 23.

FIG. 3 schematically illustrates the architecture of a third conventional DLNA system. As shown in FIG. 3, the third conventional DLNA system 3 comprises a network router 30, a digital media server (DMS) 31, a digital media renderer (DMR) 33, and a digital media controller (DMC) 34. The communication between the digital media server 31, the digital media renderer 33 and the digital media controller 34 is established through the network router 30. The digital media server 31 comprises a first storage element for storing a media file 35. The digital media renderer 33 is used for receiving and playing the media file 35 that is transmitted from the digital media server 31. The digital media controller 34 provides a control function. After the control function of the digital media controller 34 is utilized to select the stored media file 35 from the digital media server 31, the media file 35 is transmitted from the digital media server 31 to the digital media renderer 33. Consequently, the media file 35 can be played by the digital media renderer 33.

As mentioned above, the digital media server, the digital media controller, the digital media renderer and the digital media player included in the same DLNA system may transfer or play media files through the network router. The digital media server and the digital media renderer may be referred as passive control devices that can be controlled. Moreover, the digital media controller and the digital media player may be referred as active control devices that can control the passive control devices. For example, a user in a living room may allow a smart phone to be connected to a computer host in a study room. Moreover, through the smart phone, the user may browse the audio files in the computer host and select a desired audio file from the computer host. Then, the selected audio file is transmitted from the smart phone to a stereo device in the living room. After the audio file is received by the stereo set, the audio file is played by the stereo device. Consequently, the purposes of conveniently and quickly sharing media contents can be achieved by the DLNA system.

Nowadays, a novel DLNA system on the basis of the conventional DLNA system has been introduced into the market. The novel DLNA system is connected to an internet server through network connection. The internet server contains plural internet radio stations. Moreover, the real-time streaming media files from the internet radio stations may be played by the DLNA system. A method of playing the real-time streaming media files from the internet radio stations by the DLNA system will be illustrated as follows. Firstly, the user may operate an active control device of the DLNA system to establish the network communication between the active control device and a digital media server, and an internet radio station broadcast selective item of the digital media server is clicked by the user (i.e. a first operation of the user). Consequently, the digital media server is connected to the internet server through network connection, and the digital media server issues an internet radio station type search request to the internet server. In response to the internet radio station type search request, the internet server issues an internet radio station type list to the digital media server. Consequently, a first packet corresponding to the internet radio station type list is transmitted from the digital media server to the active control device. According to the first packet, the user may view plural radio station types of the internet radio stations in the internet server through the active control device.

Next, the user may operate the active control device to select a first radio station type of the plural radio station types (i.e. a second operation of the user). For example, the first radio station type is a blues song type. Then, a first internet radio station search request corresponding to the first radio station type is transmitted from the digital media server to the internet server. In response to the first internet radio station search request, plural internet radio station data are transmitted from the internet server to the digital media server. Consequently, a second packet corresponding to the plural internet radio station data is transmitted from the digital media server to the active control device. According to the second packet, the user may view all internet radio station data of the internet radio stations in the network serve through the active control device. For example, the internet radio station data contain the names of the internet radio stations.

Next, the user may operate the active control device to select a first internet radio station of the plural internet radio stations (i.e. a third operation of the user). Consequently, a first internet radio station address retrieve request corresponding to the first internet radio station is transmitted from the digital media server to the internet server. In response to the first internet radio station address retrieve request, plural first address data corresponding to the first internet radio station are transmitted from the internet server to the digital media server. Consequently, a third packet corresponding to the plural first address data is transmitted from the digital media server to the active control device. According to the third packet, the user may view the plural first address data through the active control device.

Next, the user may operate the active control device to select a first address data to be connected (i.e. a fourth operation of the user). According to the selected first address data, a digital media player or a digital media renderer of the DLNA system is directly connected to the internet server through network connection, and a real-time streaming media file corresponding to the internet radio station address is transmitted from the internet server to the DLNA system. Consequently, the real-time streaming media file from the internet radio station is played by the digital media player or the digital media renderer.

In the above method of playing the real-time streaming media file, the user has to perform four selection operations in order to establish the communication between the active control device and the digital media server and establish the communication between the digital media server and the internet server. Since the user has to perform many operations and wait for the response from the internet server in order to perform the subsequent operation, the above method of playing the real-time streaming media file is inconvenient and troublesome to the use.

Therefore, there is a need of providing a real-time streaming media playing method and a real-time streaming media playing system for playing real-time streaming media files of internet radio stations in enhanced playing efficiency.

SUMMARY OF THE INVENTION

An object of the present invention provides a real-time streaming media playing method for increasing the real-time streaming media playing efficiency.

Another object of the present invention provides a real-time streaming media playing system for playing a real-time streaming media file with enhanced playing efficiency.

In accordance with an aspect of the present invention, there is provided a real-time streaming media playing method. Firstly, a first electronic device in an area network group searches an internet server in an internet, and the internet server issues an internet radio station type list, an internet radio station list and plural address data to the first electronic device. The internet radio station type list contains plural type data corresponding to plural radio station types. The internet radio station list contains plural internet radio station data corresponding to plural internet radio stations. Then, the plural type data, the plural internet radio station data and the plural address data are stored into the first electronic device, and the internet server is correlated with a virtual folder of the first electronic device. Then, a second electronic device in the area network group is connected to the first electronic device through network connection, and the virtual folder correlated with the internet server is displayed on the second electronic device. Then, the virtual folder is selected, so that the plural type data corresponding to plural radio station types are displayed on the second electronic device. Then, a first type data of the plural type data is selected. After the first type data is selected, a playing list is transmitted from the first electronic device to the second electronic device, so that the plural internet radio station data corresponding to the first type data are displayed on the second electronic device. The playing list contains the plural internet radio station data and plural address path data corresponding to the plural internet radio stations. Then, a first internet radio station data of the plural internet radio station data is selected. After the first internet radio station data is selected, a first address data of the plural address data corresponding to a first internet radio station is acquired by the second electronic device according to a first address path data of the plural address path data corresponding to the first internet radio station, so that a real-time streaming media file corresponding to the first internet radio station is played by the second electronic device or a third electronic device in the area network group according to the first address data.

In accordance with another aspect of the present invention, there is provided a real-time streaming media playing system. The real-time streaming media playing system includes an internet server and an area network group. The internet server contains plural radio station types and plural internet radio stations, and issues an internet radio station type list, an internet radio station list and plural address data corresponding to the plural internet radio stations. The internet radio station type list contains plural type data corresponding to the plural radio station types. The internet radio station list contains plural internet radio station data corresponding to the plural internet radio stations. The area network group is connected to the internet server through network connection and playing the plural real-time streaming media files. The area network group includes a network router, a digital media server, and an active control device. The network router is connected to the internet server through network connection and providing a network connection function. The digital media server is connected to the network router through network connection and connected to the internet server via the network router through network connection. The digital media server receives the internet radio station type list, the internet radio station list and the plural address data. The digital media server includes a storage element and a controlling unit. The plural type data, the plural internet radio station data and the plural address data are stored in the storage element. The controlling unit is connected to the controlling unit. A virtual folder correlated with the internet server is created by the controlling unit according to the plural type data. The plural internet radio station data and the plural address data. A playing list is generated by the controlling unit according to the plural internet radio station data and plural address path data corresponding to the plural address data. The active control device is connected to the network router through network connection and connected to the digital media server and the internet server via the network router through network connection. The plural internet radio station data are displayed on the active control device according to the playing list. The plural address path data are acquired by the active control device according to the playing list. The plural address data are acquired by the active control device according to the plural address path data. When one of the plural internet radio stations is selected, the real-time streaming media file corresponding to the selected internet radio station is played by the area network group according to the plural address data.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 11 is a table indicating the metadata of the real-time streaming media playing system according to the embodiment of the present invention;

DETAILED DESCRIPTION OF THE PREFERRED EMBODIMENT

For obviating the drawbacks of the prior art technologies, the present invention provides a real-time streaming media playing method and a real-time streaming media playing system.

Figure 1:
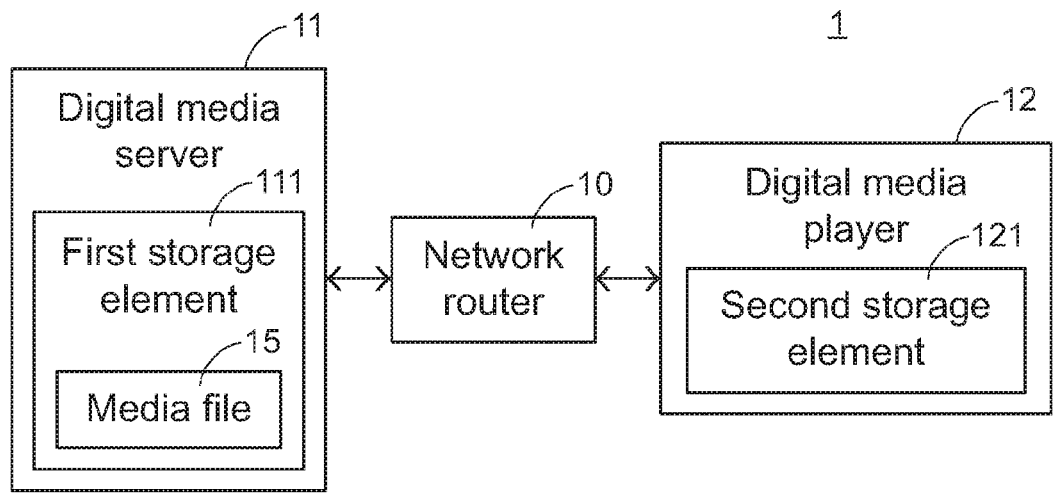
FIG. 1 schematically illustrates the architecture of a first conventional DLNA system.
Figure 2:
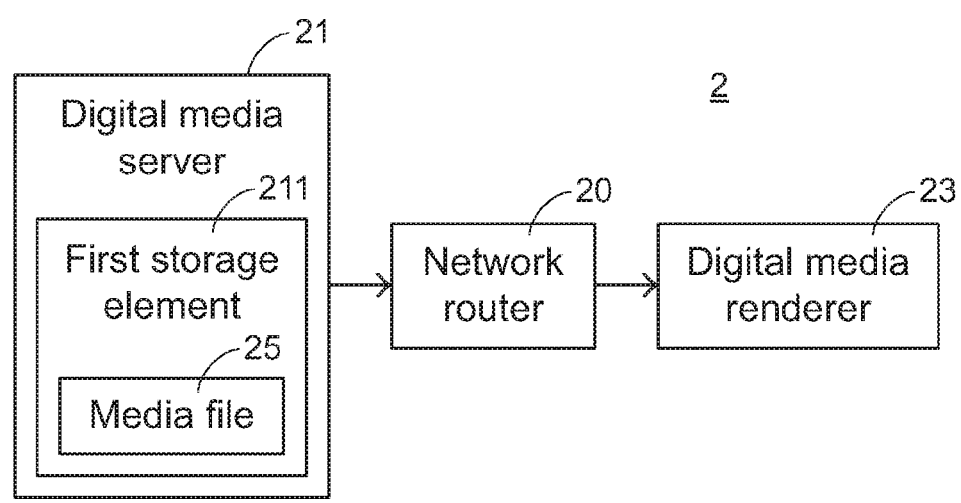
FIG. 2 schematically illustrates the architecture of a second conventional DLNA system.
Figure 3:
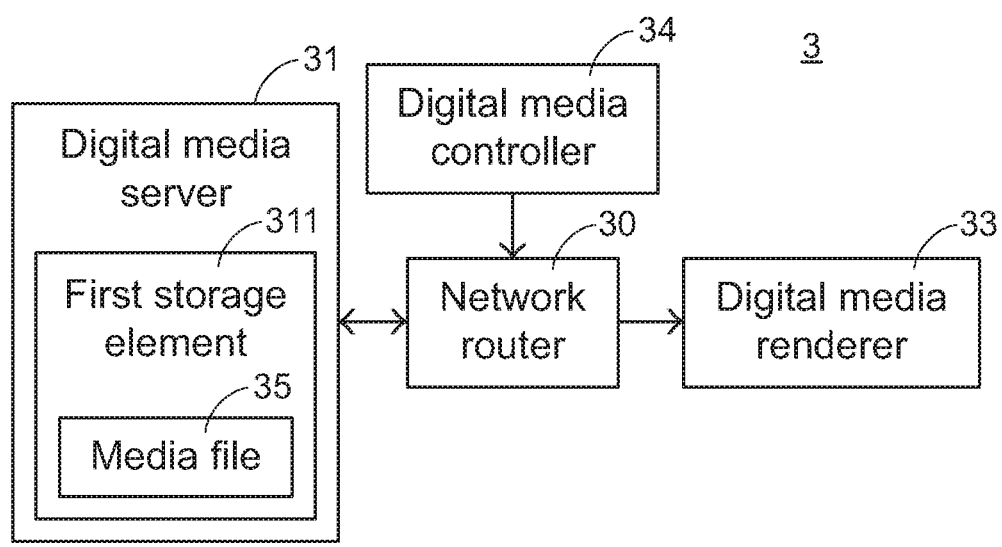
FIG. 3 schematically illustrates the architecture of a third conventional DLNA system.
Figure 4:
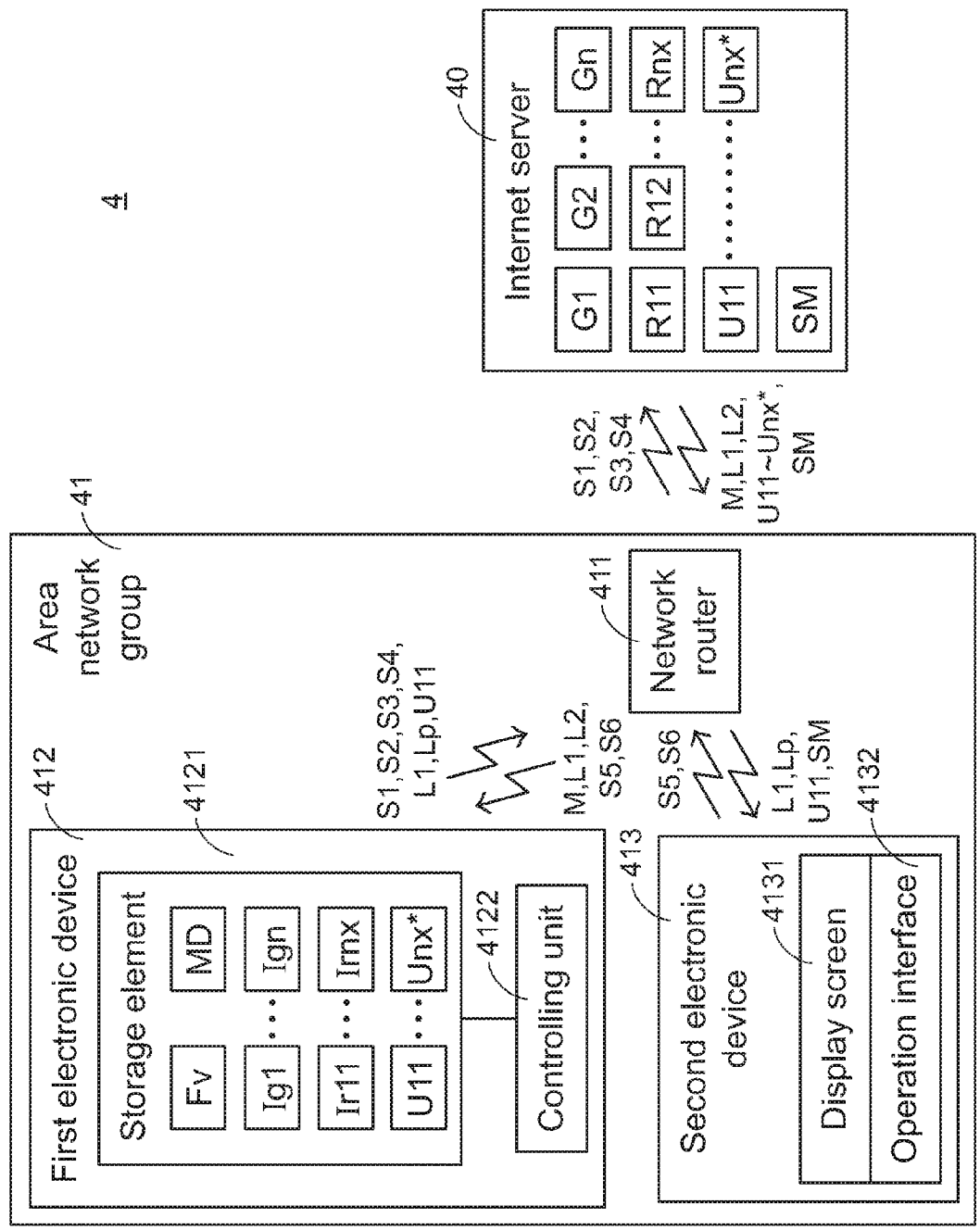
FIG. 4 is a schematic functional block diagram illustrating a real-time streaming media playing system according to an embodiment of the present invention.
Figure 5:
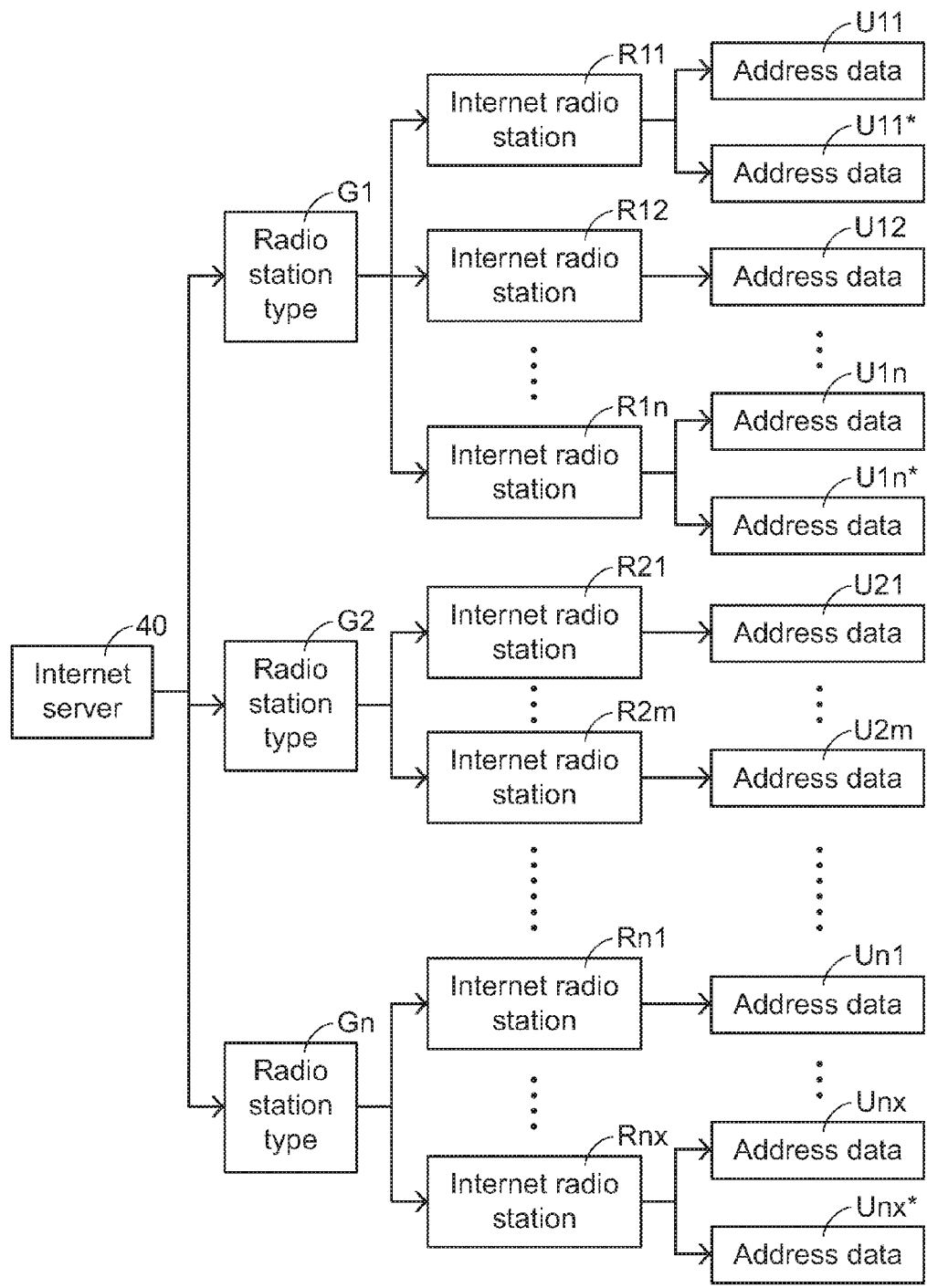
FIG. 5 schematically illustrates the architecture of an internet server of the real-time streaming media playing system according to an embodiment of the present invention.

Hereinafter, a real-time streaming media playing system of the present invention will be illustrated with reference to FIGS. 4 and 5. FIG. 4 is a schematic functional block diagram illustrating a real-time streaming media playing system according to an embodiment of the present invention. FIG. 5 schematically illustrates the architecture of an internet server of the real-time streaming media playing system according to an embodiment of the present invention. The real-time streaming media playing system 4 comprises an internet server 40 and an area network group 41. The internet server 40 comprises plural radio station types G1~Gn. The radio station type G1 of the plural radio station types contains plural internet radio stations R11~R1$n$. The radio station type G2 of the plural radio station types contains plural internet radio stations R21~R2$m$. The radio station type Gn of the plural radio station types contains plural internet radio stations Rn1~Rnx. The rest may be deduced by analogy. The internet radio station R11 corresponds to an address data U11 and another address data U11*. The internet radio station R12 corresponds to an address data U12. The internet radio station R21 corresponds to an address data U21. The rest may be deduced by analogy. As shown in FIG. 5, the plural radio station types G1~Gn, the plural internet radio stations R11~Rnx and the plural address data U11, U11*, U12, . . . , Unx and Unx* in the internet server 40 are arranged in a hierarchical architecture. The root directory of the internet server 40 is in the first level of the hierarchical architecture; the plural radio station types G1~Gn are in the second level of the hierarchical architecture; the plural internet radio stations R11~Rnx are in the third level of the hierarchical architecture; and the plural address data U11, U11*, U12, . . . , Unx and Unx* are in the fourth level of the hierarchical architecture.

The above address data are uniform resource locators (URLs). For example, the first address data U11 indicates a web address of the internet where a real-time streaming media file SM of the internet radio station R11 is stored. Consequently, the area network group 41 may be connected to the internet radio station R11 through network connection according to the address data U11. After the area network group 41 is connected to the internet radio station R11, the real-time streaming media file SM is transmitted from the internet radio station R11 to the area network group 41, so that the real-time streaming media file SM may be played by the area network group 41. Similarly, the second address data U11* corresponding to the internet radio station R11 indicates another web address of the internet where the real-time streaming media file SM of the internet radio station R11 is stored. That is, the address data U11 and the address data U11* for storing the real-time streaming media file SM are provided to the area network group 41. If the address data U11 is used by so many users, the real-time streaming media file SM may be played according to the address data U11*. Since the real-time streaming media file SM is not played by many users according to the same address data, the network connection speed is not too slow. Consequently, the real-time streaming media file SM can be smoothly played.

As shown in FIG. 4, the area network group 41 comprises a network router 411, a first electronic device 412, and a second electronic device 413. The network router 411 is used to provide a network connection function. The first electronic device 412 and the second electronic device 413 are connected with each other via the network router 411 through network connection. Moreover, the first electronic device 412 and the second electronic device 413 are connected to the internet server 40 via the network router 411 through network connection. The first electronic device 412 is connected to the network router 411 through network connection. Moreover, the first electronic device 412 is connected to the second electronic device 413 and the internet server 40 via the network router 411 through network connection. Consequently, the data from the internet server 40 can be received by and stored into the first electronic device 412. The first electronic device 412 comprises a storage element 4121 and a controlling unit 4122. The storage element 4121 is included in the first electronic device 412 for storing these data. The controlling unit 4122 is connected to the storage element 4121. According to these data, a virtual folder Fv corresponding to the internet server 40 is created by the controlling unit 4122. These data provided by the internet server 40 will be illustrated in more details later. In this embodiment, the first electronic device 412 is a digital media server, the storage element 4121 is a hard disc, and the controlling unit 4122 is a microprocessor.

The second electronic device 413 is connected to the network router 411 through network connection. Moreover, the second electronic device 413 is connected to the first electronic device 412 and the internet server 40 via the network router 411 through network connection. When the second electronic device 413 is connected to the first electronic device 412 through network connection, the virtual folder Fv is displayed on the second electronic device 413. Consequently, the contents of the internet server 40 corresponding to the virtual folder Fv can be viewed by the user through the second electronic device 413. The second electronic device 413 comprises a display screen 4131 and an operation interface 4132. The virtual folder Fv and the internal architecture of the internet server 40 can be displayed on the display screen 4131. Via the operation interface 4132, the user may operate the virtual folder Fv and the internal architecture of the internet server 40 in order to generate corresponding operation commands. In this embodiment, the second electronic device 413 is an active control device such as a digital media player. Moreover, the network router 411 complies with the universal plug and play (UPnP) protocol. Moreover, both of the first electronic device 412 and the second electronic device 413 comply with the Digital Living Network Alliance (DLNA) protocol.

The details contents of the data provided by the internet server 40 will be illustrated as follows. When the first electronic device 412 of the real-time streaming media playing system 4 is connected to the internet server 40 through network connection, the internet server 40 issues an internet radio station type list L1, an internet radio station list L2 and the plural address data U11, U11*, U12, . . . , Unx and Unx* to the first electronic device 412 according to the requirements of the first electronic device 412. The internet radio station type list L1 contains plural type data Ig1~Ign corresponding to the plural radio station types G1~Gn. The internet radio station list L2 contains plural internet radio station data Ir11~Ir1n corresponding to the plural internet radio stations R11~R1n, plural internet radio station data Ir21~Ir2m corresponding to the plural internet radio stations R21~R2m, . . . , and plural internet radio station data Irn1~Irnx corresponding to the plural internet radio stations Rn1~Rnx. After the second electronic device 413 is connected to the first electronic device 412 through network connection, the user may view the plural type data Ig1~Ign through the second electronic device 413 in order to realize that the plural radio station types G1~Gn are contained in the area network group 41. Similarly, the user may view the plural internet radio station data Ir11~Irnx through the second electronic device 413 in order to realize that the plural internet radio stations R11~Rnx are contained in the area network group 41.

Figure 6:
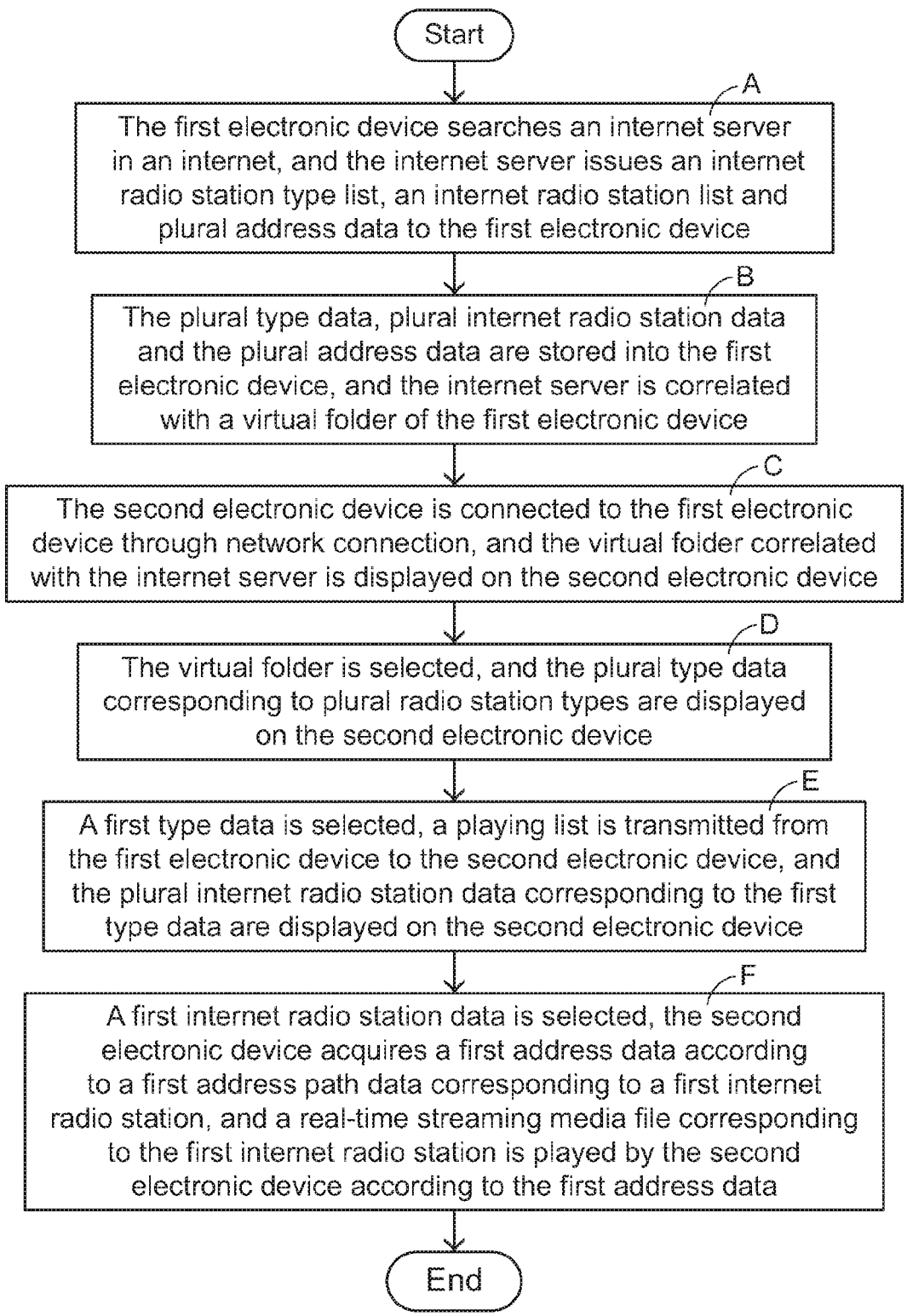
FIG. 6 is a flowchart illustrating a real-time streaming media playing method according to an embodiment of the present invention.

Hereinafter, a real-time streaming media playing method according to the present invention will be illustrated with reference to FIG. 6. FIG. 6 is a flowchart illustrating a real-time streaming media playing method according to an embodiment of the present invention. The real-time streaming media playing method comprises the following steps. Firstly, in a step A, the first electronic device searches an internet server in the internet, and the internet server issues an internet radio station type list, an internet radio station list and plural address data to the first electronic device. In a step B, plural type data, plural internet radio station data and the plural address data are stored into the first electronic device, and the internet server is correlated with a virtual folder of the first electronic device. In a step C, the second electronic device is connected to the first electronic device through network connection, and the virtual folder correlated with the internet server is displayed on the second electronic device. In a step D, the virtual folder is selected, and the plural type data corresponding to plural radio station types are displayed on the second electronic device. In a step E, a first type data is selected, a playing list is transmitted from the first electronic device to the second electronic device, and the plural internet radio station data corresponding to the first type data are displayed on the second electronic device. In a step F, a first internet radio station data is selected, and a first address data is acquired by the second electronic device according to a first address path data corresponding to a first internet radio station, so that a real-time streaming media file corresponding to the first internet radio station is played by the second electronic device according to the first address data.

Figure 7:
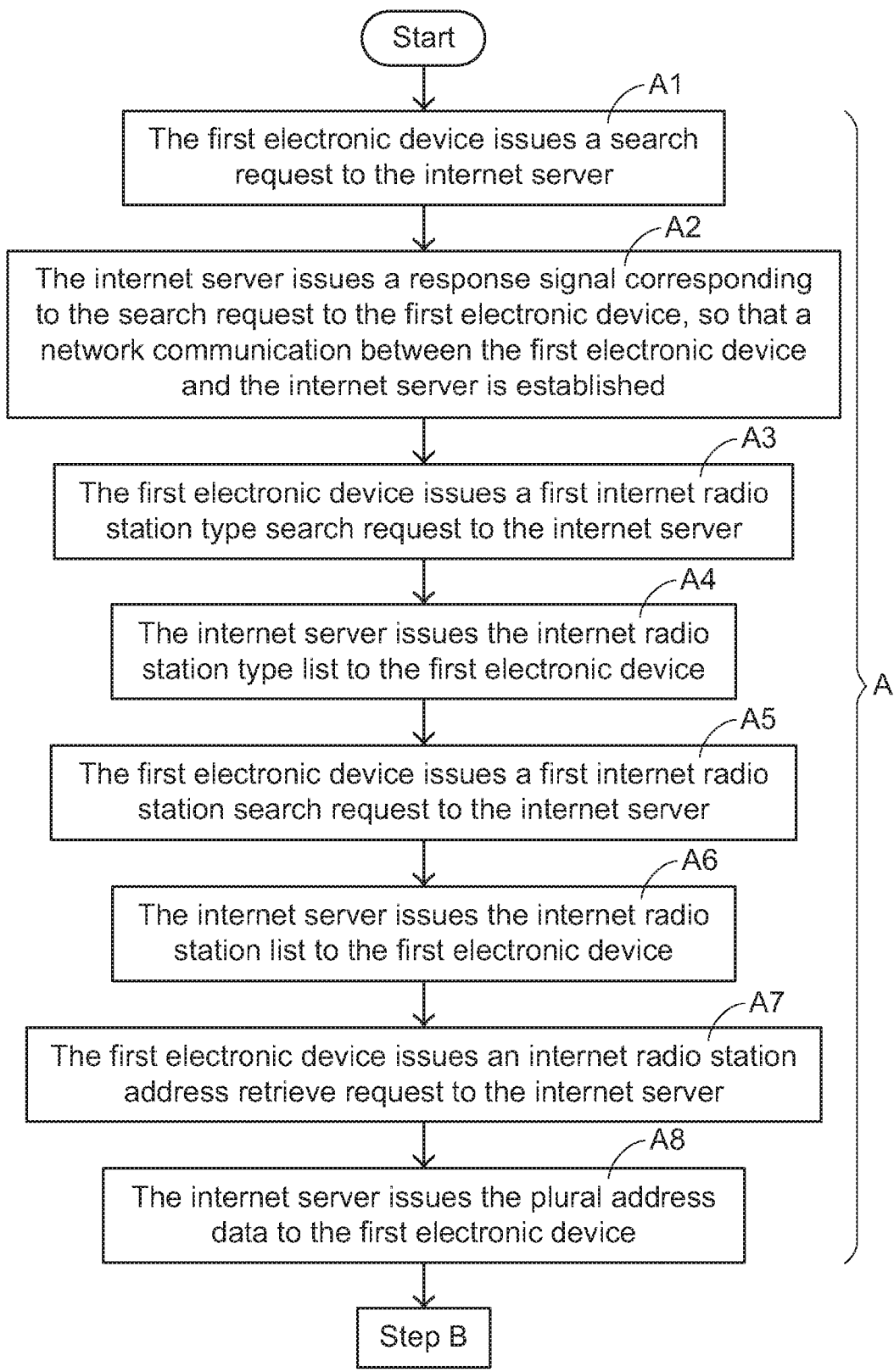
FIG. 7 is a flowchart illustrating the step A of the real-time streaming media playing method according to the embodiment of the present invention.

Hereinafter, the detailed procedures of the step A of the real-time streaming media playing method of the present invention will be illustrated with reference to FIG. 7. FIG. 7 is a flowchart illustrating the step A of the real-time streaming media playing method according to the embodiment of the present invention. The step A comprises the following sub-steps A1~A8.

In the sub-step A1, the first electronic device issues a search request to the internet server. In the sub-step A2, a response signal corresponding to the search request is transmitted from the internet server to the first electronic device, so that a network communication between the first electronic device and the internet server is established. In the sub-step A3, the first electronic device issues a first internet radio station type search request to the internet server. In the sub-step A4, the internet server issues the internet radio station type list to the first electronic device. In the sub-step A5, the first electronic device issues a first internet radio station search request to the internet server. In the sub-step A6, the internet server issues the internet radio station list to the first electronic device. In the sub-step A7, the first electronic device issues an internet radio station address retrieve request to the internet server. In the sub-step A8, the internet server issues the plural address data to the first electronic device.

Figure 8:
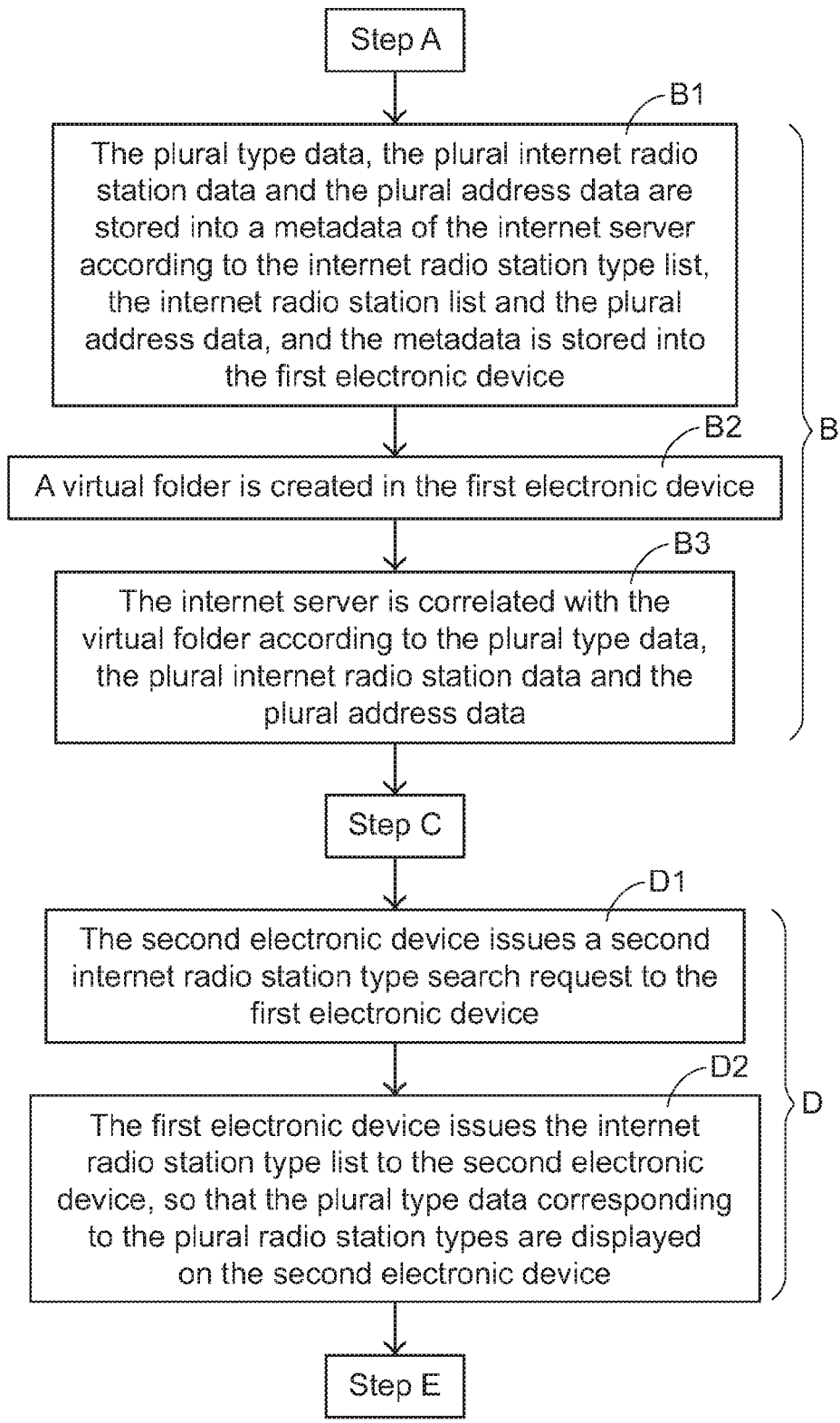
FIG. 8 is a flowchart illustrating the step B and the step D of the real-time streaming media playing method according to the embodiment of the present invention.

Hereinafter, the detailed procedures of the step B and the step D of the real-time streaming media playing method of the present invention will be illustrated with reference to FIG. 8. FIG. 8 is a flowchart illustrating the step B and the step D of the real-time streaming media playing method according to the embodiment of the present invention. The step B comprises the following sub-steps B1~B3.

In the sub-step B1, the plural type data, the plural internet radio station data and the plural address data are stored into a metadata of the internet server according to the internet radio station type list, the internet radio station list and the plural address data, and the metadata is stored into the first electronic device. In the sub-step B2, the virtual folder is created in the first electronic device. In the sub-step B3, the internet server is correlated with the virtual folder according to the plural type data, the plural internet radio station data and the plural address data.

As shown in FIG. 8, the step D comprises the following sub-steps D1~D2. In the sub-step D1, the second electronic device issues a second internet radio station type search request to the first electronic device. In the sub-step D2, the first electronic device issues the internet radio station type list to the second electronic device, so that the plural type data corresponding to the plural radio station types are displayed on the second electronic device.

The metadata of the of the internet server describes the data property information in order to indicate the storage location, the history data, the resource search, the file record or any other appropriate information. In other words, the metadata is an electronic list for achieving a list editing function. The metadata describes the contents or the features of the shared folder in order to facilitate searching the media data.

Figure 9:
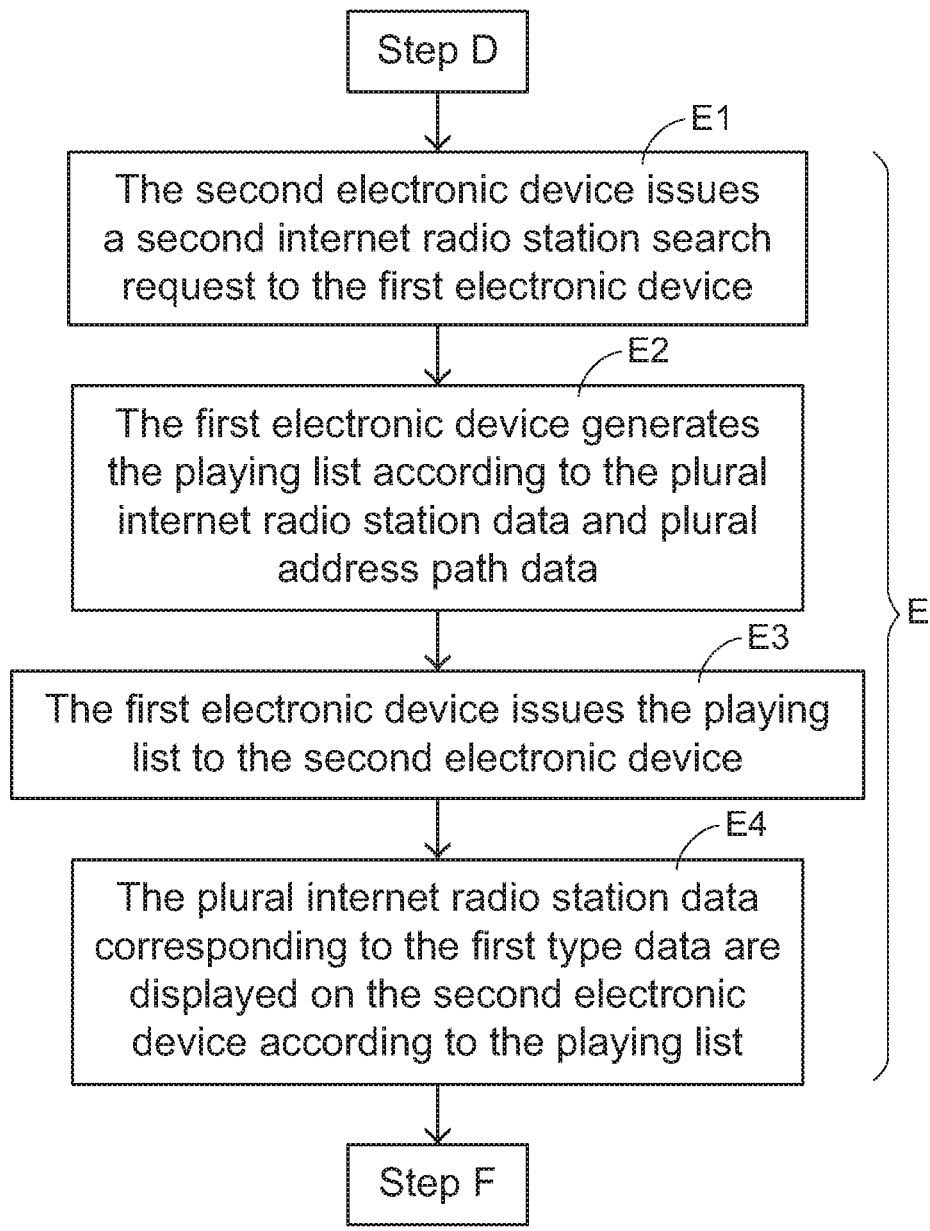
FIG. 9 is a flowchart illustrating the step E of the real-time streaming media playing method according to the embodiment of the present invention.

Hereinafter, the detailed procedures of the step E of the real-time streaming media playing method of the present invention will be illustrated with reference to FIG. 9. FIG. 9 is a flowchart illustrating the step E of the real-time streaming media playing method according to the embodiment of the present invention. The step E comprises the following sub-steps E1~E4.

In the sub-step E1, the second electronic device issues a second internet radio station search request to the first electronic device. In the sub-step E2, the first electronic device generates the playing list according to the plural internet radio station data and plural address path data. In the sub-step E3, the first electronic device issues the playing list to the second electronic device. In the sub-step E4, the plural internet radio station data corresponding to the first type data are displayed on the second electronic device according to the playing list.

Figure 10:
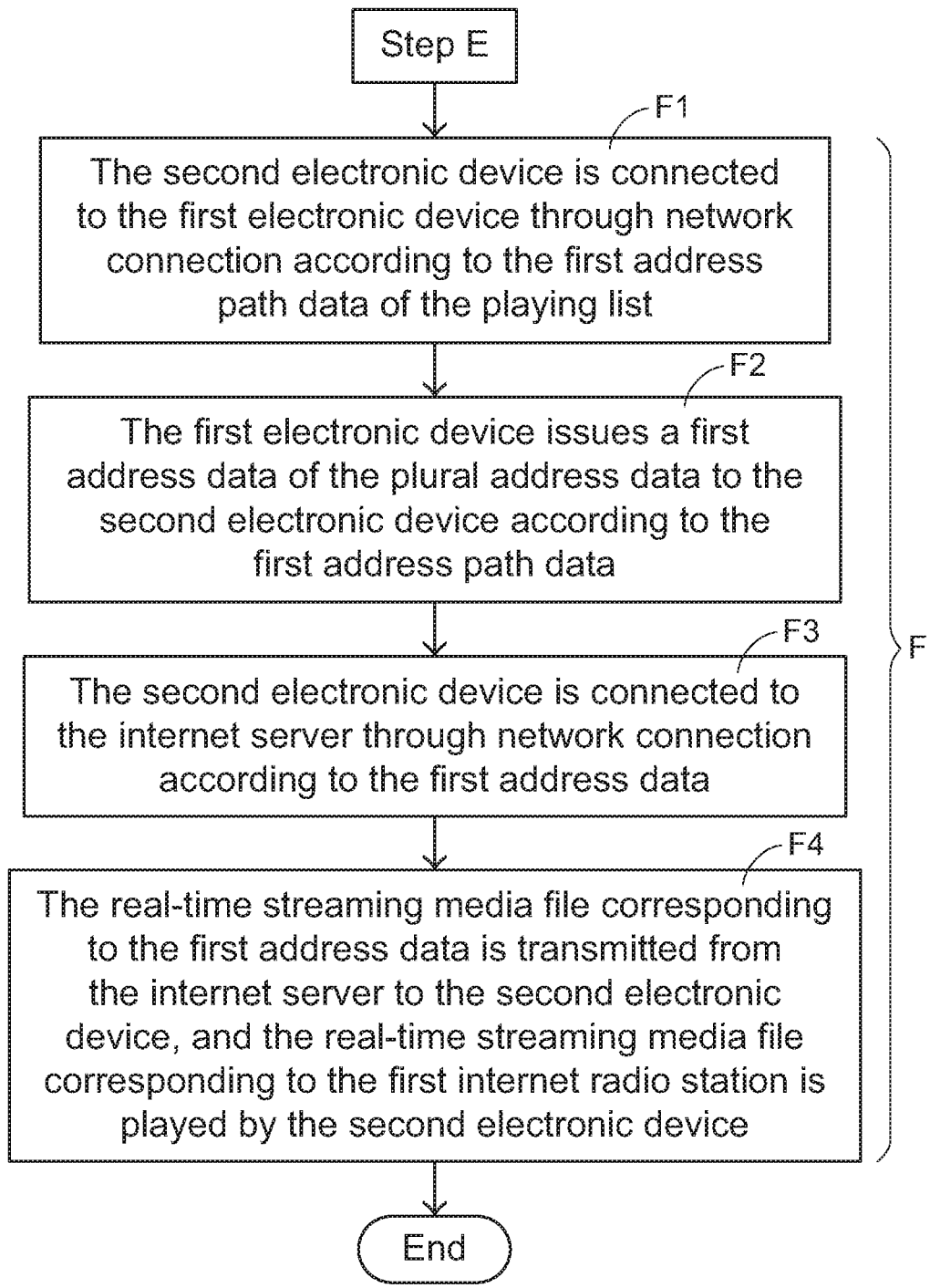
FIG. 10 is a flowchart illustrating the step F of the real-time streaming media playing method according to the embodiment of the present invention.

Hereinafter, the detailed procedures of the step F of the real-time streaming media playing method of the present invention will be illustrated with reference to FIG. 10. FIG. 10 is a flowchart illustrating the step F of the real-time streaming media playing method according to the embodiment of the present invention. The step F comprises the following sub-steps F1~F4.

In the sub-step F1, the second electronic device is connected to the first electronic device through network connection according to the first address path data of the playing list. In the sub-step F2, the first electronic device issues a first address data of the plural address data to the second electronic device according to the first address path data. In the sub-step F3, the second electronic device is connected to the internet server through network connection according to the first address data. In the sub-step F4, the real-time streaming media file corresponding to the first address data is transmitted from the internet server to the second electronic device, and the real-time streaming media file corresponding to the first internet radio station is played by the second electronic device.

Hereinafter, the detailed procedure of the real-time streaming media playing method performed by the real-time streaming media playing system 4 will be illustrated with reference to FIGS. 4, 5, 6 and 7. After the first electronic device 412 of the area network group 41 is turned on, the first electronic device 412 issues a search request S1 to the internet server 40 through the network router 411. That is, the sub-step A1 is performed. After the search request S1 is received by the internet server 40, the internet server 40 issues a response signal M to the first electronic device 412. Consequently, the network communication between the first electronic device 412 and the internet server 40 is established. That is, the sub-step A2 is performed. On the other hand, if the response signal M is not received by the first electronic device 412 within a first predetermined time interval, it means that the search request S1 is not received by the internet server 40 or the internet server 40 has a malfunction. Under this circumstance, the sub-step A1 is repeatedly done until the response signal M is received by the first electronic device 412.

After the network communication between the first electronic device 412 and the internet server 40 is established, the first electronic device 412 issues a first internet radio station type search request S2 to the internet server 40. That is, the sub-step A3 is performed. After the first internet radio station type search request S2 is received by the internet server 40, an internet radio station type list L1 containing plural type data Ig1~Ign is transmitted to the first electronic device 412 in response to the first internet radio station type search request S2. That is, the sub-step A4 is performed. On the other hand, if the internet radio station type list L1 is not received by the first electronic device 412 within a second predetermined time interval, it means that the radio station type search request S2 is not received by the internet server 40 or the internet server 40 has a malfunction. Under this circumstance, the sub-step A3 is repeatedly done until the internet radio station type list L1 is received by the first electronic device 412. After the internet radio station type list L1 is received by the first electronic device 412, the plural type data Ig1~Ign are stored into the storage element 4121.

Then, the first electronic device 412 issues a first internet radio station search request S3 to the internet server 40. That is, the sub-step A5 is performed. After the first internet radio station search request S3 is received by the internet server 40, an internet radio station list L2 containing plural internet radio station data Ir11~Irnx is transmitted from the internet server 40 to the first electronic device 412 in response to the first internet radio station search request S3. That is, the sub-step A6 is performed. On the other hand, if the internet radio station list L2 is not received by the first electronic device 412 within a third predetermined time interval, it means that the first internet radio station search request S3 is not received by the internet server 40 or the internet server 40 has a malfunction. Under this circumstance, the sub-step A5 is repeatedly done until the internet radio station list L2 is received by the first electronic device 412. After the internet radio station list L2 is received by the first electronic device 412, the plural internet radio station data Ir11~Irnx are stored into the storage element 4121.

After the plural internet radio station data Ir11~Irnx are stored into the storage element 4121, the first electronic device 412 issues an internet radio station address retrieve request S4 to the internet server 40. That is, the sub-step A7 is performed. After the internet radio station address retrieve request S4 is received by the internet server 40, the internet server issues plural address data U11, U11*, U12, . . . , Unx and Unx* to the first electronic device 412. That is, the sub-step A8 is performed. On the other hand, if the plural address data U11, U11*, U12, . . . , Unx and Unx* are not received by the first electronic device 412 within a fourth predetermined time interval, it means that the internet radio station address retrieve request S4 is not received by the internet server 40 or the internet server 40 has a malfunction. Under this circumstance, the sub-step A7 is repeatedly done until the plural address data U11, U11*, U12, . . . , Unx and Unx* are received by the first electronic device 412. After the plural address data U11, U11*, U12, . . . , Unx and Unx* are received by the first electronic device 412, the plural address data U11, U11*, U12, . . . , Unx and Unx* are received by the first electronic device 412 are stored into the storage element 4121.

After the plural type data Ig1~Ign, the plural internet radio station data Ir11~Irnx and the plural address data U11, U11*, U12, . . . , Unx and Unx* are stored into the storage element 4121, the step B is started. Please refer to FIGS. 4, 5, 6 and 8. Firstly, the plural type data Ig1~Ign, the plural internet radio station data Ir11~Irnx and the plural address data U11, U11*, U12, . . . , Unx and Unx* are written into a metadata MD of the internet server 40 by the controlling unit 4122, and the metadata MD is stored into the storage element 4121 in order to record the arrangement of the hierarchical architecture of the internet server 40. That is, the sub-step B1 is performed.

The following three aspects should be specially described. Firstly, the plural type data Ig1~Ign contain corresponding name data, corresponding identity data and corresponding kinship data. For example, the name information corresponding to the type data Ig1 indicates that the radio station type is G1 (e.g. a rock music type). The identity data corresponding to the type data Ig1 denotes the identification information of the radio station type G1 in the internet server 40. The identity data corresponding to the type data Ig1 is 1. The kinship data corresponding to the type data Ig1 is 0. Moreover, the identity data for defining the root directory of the internet server 40 is 0. The contents of the metadata MD are shown in FIG. 11. Similarly, the name information corresponding to the type data Ig2 indicates that the radio station type is G2 (e.g. a blues song type). The identity data corresponding to the type data Ig2 is 2, which is different to the identity data of the radio station type G1. The kinship data corresponding to the type data Ig2 is 0. Consequently, the internet server 40 is in the first level of the root directory. According to the kinship data, the radio station type G1 and the radio station type G2 are in the second level of the root directory. The rest may be deduced by analogy.

Secondly, the contents of the plural internet radio station data Ir11~Irnx are similar to the contents of the plural type data Ig1~Ign. That is, the plural internet radio station data Ir11~Irnx corresponding name data, corresponding identity data and corresponding kinship data. For example, the name information corresponding to the internet radio station data Ir11 indicates that the internet radio station is R11 (e.g. "The Rock Radio"). The identity data corresponding to the internet radio station data Ir11 is 11, and the identity data denotes the identification information of the internet radio station R11 in internet server 40. The kinship data corresponding to the internet radio station data Ir11 is 1. In other words, the internet radio station R11 is contained in the radio station type G1. Moreover, the internet radio station R11 in the third level of the root directory, which is under the level of the radio station type G1 (see FIG. 11). According to the corresponding identity data and corresponding kinship data, the controlling unit 4122 may realize that the internet radio station R11 is contained in the radio station type G1 and the internet radio station R11 in the next level of the radio station type G1. According to the identity data and the kinship data corresponding internet radio station corresponding to the remaining internet radio station data Ir12~Irnx, the controlling unit 4122 may realize the similar results, which are not redundantly described herein.

Thirdly, the address data U11 contains the internet radio station name data corresponding to the internet radio station data Ir11, so that the address data U11 corresponds to the internet radio station R11. Similarly, the remaining address data U11*, U12, . . . , Unx and Unx* contain the internet radio station name data corresponding to the remaining internet radio station data Ir12~Irnx, respectively. Consequently, the remaining address data U11*, U12, . . . , Unx and Unx* correspond to the remaining internet radio stations. From the above discussions, the entire hierarchical architecture of the internet server 40 may be stored by the controlling unit 4122 according to the plural type data Ig1~Ign, the plural internet radio station data Ir11~Irnx and the plural address data U11, U11*, U12, . . . , Unx and Unx*.

Then, a virtual folder Fv is created in the storage element 4121 by the controlling unit 4122. That is, the sub-step B2 is performed. Moreover, the internet server 40 is correlated with the virtual folder Fv according to the plural type data Ig1~Ign, the plural internet radio station data Ir11~Irnx and the plural address data U11, U11*, U12, . . . , Unx and Unx*. That is, the sub-step B3 is performed. All of the plural type data Ig1~Ign and the plural internet radio station data Ir11~Irnx contain character data. The content of the character data is the internet server. According to the character data, the internet server 40 is correlated with the virtual folder Fv by the controlling unit 4122.

After the step B is completed, the second electronic device 413 is connected to the first electronic device 412 via the network router 411 through network connection. Consequently, the virtual folder Fv correlated with the internet server 40 is displayed on the display screen 4131 of the second electronic device 413. That is, the step C is performed.

Then, in the sub-step D1, the virtual folder Fv is selected by the user via the operation interface 4132 of the second electronic device 413. In other words, a first operation of the user is performed. Meanwhile, the second electronic device 413 issues a second internet radio station type search request S5 to the first electronic device 412. In response to the second internet radio station type search request S5, the first electronic device 412 issues the internet radio station type list L1 to the second electronic device 413, so that the plural type data Ig1~Ign corresponding to plural radio station types G1~Gn are displayed on the display screen 4131 of the second electronic device 413. That is, the sub-step D2 is performed.

Please refer to FIGS. 4, 6 and 9. In the sub-step E1, the radio station type G1 of the plural radio station types G1~Gn is selected by the user via the operation interface 4132 of the second electronic device 413. Consequently, the second electronic device 413 issues a second internet radio station search request S6 to the first electronic device 412. In other words, a second operation of the user is performed. In response to the second internet radio station search request S6, the controlling unit 4122 generates a playing list Lp according to the plural internet radio station data Ir11~Ir1*n* and plural address path data. That is, the sub-step E2 is performed. The playing list Lp contains the files names corresponding to the plural internet radio stations R11~R1*n* and the plural address path data corresponding to the plural internet radio stations R11~R1*n*. The plural address path data denote the web addresses of the first electronic device 412 where the plural address data U11, U11*, U12, . . . , U1*n* and U1n* are stored. That is, according to the address path data corresponding to the address data U11, the address data U11 is acquired by the user through the first electronic device 412. In this embodiment, the file format of the playing list Lp is a pls file format or a m3u file format.

Then, in the sub-step E3, the first electronic device 412 issues the playing list Lp to the second electronic device 413 via the network router 411. Moreover, according to the plural internet radio station data Ir11~Ir1n of the playing list Lp, the plural internet radio station data Ir11~Ir1n are displayed on the display screen 4131 of the second electronic device 413. That is, the sub-step E4 is performed.

Please refer to FIGS. 4, 6 and 10. In the sub-step F1, the first internet radio station data Ir11 is selected by the user via the operation interface 4132 of the second electronic device 413. Consequently, the second electronic device 413 is connected to the first electronic device 412 through network connection according to a first address path data of the playing list Lp. In other words, a third operation of the user is performed. According to the first address path data, the first address data U1f corresponding to the first address path data is transmitted from the first electronic device 412 to the second electronic device 413. That is, the sub-step F2 is performed. After the first address data U11 is received by the second electronic device 413, the second electronic device 413 is connected to the internet server 40 via the network router 411 through network connection. That is, the sub-step F3 is performed. Finally, a real-time streaming media file SM corresponding to the first address data U11 is transmitted from the internet server 40 to the second electronic device 413. After the real-time streaming media file SM is received by the second electronic device 413, the real-time streaming media file SM corresponding to the first internet radio station R11 is played by the second electronic device 413. That is, the sub-step F4 is performed. Meanwhile, the real-time streaming media playing method of the present invention is completed. The steps of playing the real-time streaming media files corresponding to other internet radio stations are similar to above steps, and are not redundantly described herein.

Figure 12:
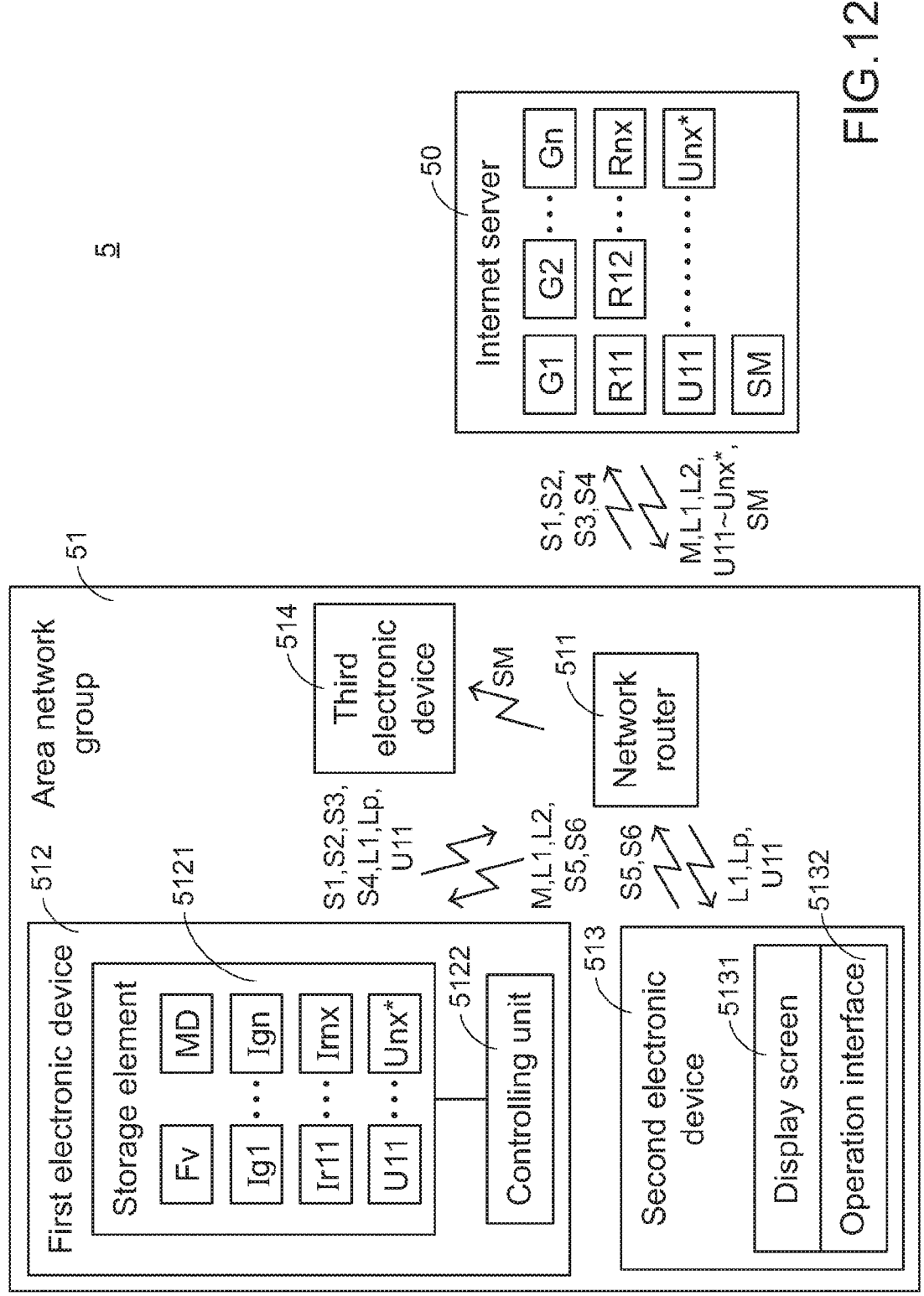
FIG. 12 is a schematic functional block diagram illustrating a real-time streaming media playing system according to another embodiment of the present invention.

The present invention further provides another embodiment, which is distinguished from the above embodiment. FIG. 12 is a schematic functional block diagram illustrating a real-time streaming media playing system for playing a real-time streaming media file according to another embodiment of the present invention. The real-time streaming media playing system 5 comprises an internet server 50 and an area network group 51. The configurations and functions of the internet server 50 are identical to those of the internet server 40 of the above embodiment, and are not redundantly described herein. As shown in FIG. 12, the area network group 51 comprises a network router 511, a first electronic device 512, a second electronic device 513, and a third electronic device 514. The first electronic device 512 comprises a storage element 5121 and a controlling unit 5122. The second electronic device 513 comprises a display screen 5131 and an operation interface 5132. The third electronic device 514 is connected to the network router 511 through network connection. Moreover, the third electronic device 514 is connected to the second electronic device 513, the first electronic device 512 and the internet server 50 via the network router 511 through network connection. In this embodiment, the second electronic device 513 is an active control device such as a digital media controller, and the second electronic device 513 does not have the function of playing the real-time streaming media file. Moreover, the third electronic device 514 is a digital media renderer for playing the real-time streaming media file.

The operations of the network router 511, the first electronic device 512 and the internet server 50 are similar to those of the above embodiment, and are not redundantly described herein. In comparison with the above embodiment, the operations between the second electronic device 513 and the third electronic device 514 are distinguished. In other words, the steps A~E of the real-time streaming media playing method of the above embodiment are also implemented by the real-time streaming media playing system 5, but the step F* to be implemented by the real-time streaming media playing system 5 is distinguished.

Figure 13:
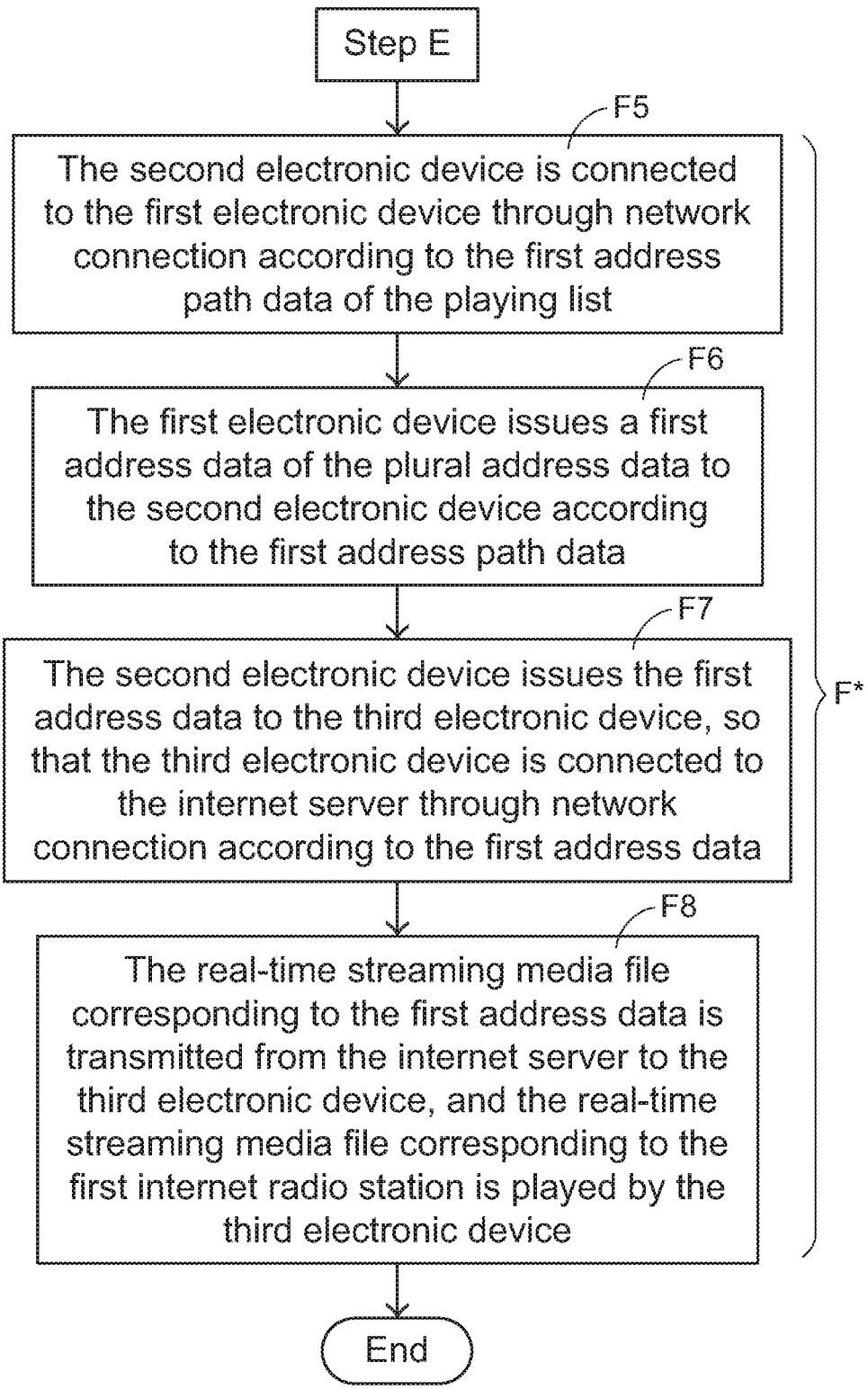
FIG. 13 is a flowchart illustrating the step F* of a real-time streaming media playing method according to another embodiment of the present invention.

Hereinafter, the detailed procedures of the step F* of this embodiment will be illustrated with reference to FIG. 13. FIG. 13 is a flowchart illustrating the step F* of a real-time streaming media playing method according to another embodiment of the present invention. The step F* comprises the following sub-steps F5~F8.

In the sub-step F5, the second electronic device is connected to the first electronic device through network connection according to the first address path data of the playing list. In the sub-step F6, the first electronic device issues a first address data of the plural address data to the second electronic device according to the first address path data. In the sub-step F7, the second electronic device issues the first address data to the third electronic device, so that the third electronic device is connected to the internet server through network connection according to the first address data. In the sub-step F8, the real-time streaming media file corresponding to the first address data is transmitted from the internet server to the third electronic device, and the real-time streaming media file corresponding to the first internet radio station is played by the third electronic device.

Please refer to FIGS. 12 and 13 again. After the steps A-E of the real-time streaming media playing method of the above embodiment are implemented by the real-time streaming media playing system 5, the first internet radio station data Ir11 is selected by the user via the operation interface 5132 of the second electronic device 513. Consequently, the second electronic device 513 is connected to the first electronic device 512 through network connection according to a first address path data of the playing list Lp. That is, the sub-step F5 is performed. According to the first address path data, the first address data U11 corresponding to the first address path data is transmitted from the first electronic device 512 to the second electronic device 513. That is, the sub-step F6 is performed. After the first address data U11 is received by the second electronic device 513, the first address data U11 is transmitted from the second electronic device 513 to the third electronic device 514, so that the third electronic device 514 is connected to the internet server 50 via the network router 511 through network connection. That is, the sub-step F7 is performed. Finally, a real-time streaming media file SM corresponding to the first address data U11 is transmitted from the internet server 50 to the third electronic device 514. After the real-time streaming media file SM is received by the third electronic device 514, the real-time streaming media file SM corresponding to the first internet radio station R11 is played by the third electronic device 514. That is, the sub-step F8 is performed.

That is, in addition to the use of the digital media player to play the real-time streaming media file, the real-time streaming media playing system of the present invention may use the digital media renderer to play the real-time streaming media file.

From the above descriptions, the present invention provides a real-time streaming media playing system and a real-time streaming media playing method. Especially, plural type data, plural internet radio station data and plural address data may be previously stored into a digital media server. When the user wants to play the real-time streaming media file, an active control device has to be in communication with the digital media server through network connection. After the address data corresponding to the real-time streaming media file is acquired by the active control device, the active control device is connected with an internet server through network connection according to the address data. Consequently, the real-time streaming media file can be played by the active control device. According to the plural internet radio station data and plural address path data corresponding to the plural address data, the digital media server generates a playing list. The playing list is transmitted from the digital media server to the active control device. Consequently, the number of times for the operation of the user will be reduced. In accordance with the real-time streaming media playing method of the present invention, three operations of the user are sufficient to play the real-time streaming media file. In comparison with the conventional method requiring four operations of the user, the number of times for the operation of the user according to the method of the present invention is reduced. Moreover, during the operations of the user, the active control device is in communication with the digital media server. In other words, the frequency of establishing the communication between the area network group and the internet server is largely reduced. Consequently, the operating speed of the real-time streaming media playing system of the present invention is enhanced, the playing efficiency is increased, the waiting time of the user is reduced, and the operating convenience is enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A real-time streaming media playing method, comprising steps of:
   (A) allowing a first electronic device in an area network group to search an internet server on the Internet, and allowing the internet server to issue an internet radio station type list, an internet radio station list and plural address data to the first electronic device, wherein the internet radio station type list contains plural type data corresponding to plural radio station types, and the internet radio station list contains plural internet radio station data corresponding to plural internet radio stations;
   (B) storing the plural type data, the plural internet radio station data and the plural address data into the first electronic device, and correlating the internet server with a virtual folder of the first electronic device;
   (C) allowing a second electronic device in the area network group to be connected to the first electronic device through network connection, and allowing the virtual folder correlated with the internet server to be displayed on the second electronic device;
   (D) selecting the virtual folder, so that the plural type data corresponding to plural radio station types are displayed on the second electronic device;
   (E) selecting a first type data of the plural type data, wherein after the first type data is selected, a playing list is transmitted from the first electronic device to the second electronic device, so that the plural internet radio station data corresponding to the first type data are displayed on the second electronic device, wherein the playing list contains the plural internet radio station data and plural address path data corresponding to the plural internet radio stations; and
   (F) selecting a first internet radio station data of the plural internet radio station data, wherein after the first internet radio station data is selected, a first address data of the plural address data corresponding to a first internet radio station is acquired by the second electronic device according to a first address path data of the plural address path data corresponding to the first internet radio station, so that a real-time streaming media file corresponding to the first internet radio station is played by the second electronic device or a third electronic device in the area network group according to the first address data, wherein the step (F) comprises sub-steps of:
      (F1) selecting the first internet radio station data of the plural internet radio station data, wherein after the first internet radio station data is selected, the second electronic device is connected to the first electrode device through network connection according to the first address path data of the playing list, wherein the first address path data corresponds to the first internet radio station;
      (F2) issuing a first address data of the plural address data from the first electronic device to the second electronic device according to the first address path data, wherein the first address data corresponds to the first internet radio station;
      (F3) allowing the second electronic device to be connected to the internet server through network connection according to the first address data; and
      (F4) issuing the real-time streaming media file corresponding to the first address data from the internet server to the second electronic device, and playing the real-time streaming media file corresponding to the first internet radio station by the second electronic device.

2. The real-time streaming media playing method according to claim 1, wherein the step (A) comprises sub-steps of:
   (A1) issuing a search request from the first electronic device to the internet server;
   (A2) issuing a response signal corresponding to the search request from the internet server to the first electronic device, so that a network communication between the first electronic device and the internet server is established;
   (A3) issuing a first internet radio station type search request from the first electronic device to the internet server;
   (A4) issuing the internet radio station type list from the internet server to the first electronic device;
   (A5) issuing a first internet radio station search request from the first electronic device to the internet server;
   (A6) issues the internet radio station list from the internet server to the first electronic device;

(A7) issuing an internet radio station address retrieve request from the first electronic device to the internet server; and (A8) issuing the plural address data from the internet server to the first electronic device.

3. The real-time streaming media playing method according to claim 1, wherein the step (B) comprises sub-steps of:

(B1) storing the plural type data, the plural internet radio station data and the plural address data into a metadata corresponding to the internet server according to the internet radio station type list, the internet radio station list and the plural address data, and storing the metadata into the first electronic device;

(B2) creating a virtual folder in the first electronic device; and (B3) correlating the internet server with the virtual folder according to the plural type data, the plural internet radio station data and the plural address data, wherein each of the plural type data, the plural internet radio station data and the plural address data contains a character data corresponding to the internet server, and the internet server is correlated with the virtual folder according to the character data.

4. The real-time streaming media playing method according to claim 1, wherein the step (D) comprises sub-steps of:

(D1) selecting the virtual folder, and issuing a second internet radio station type search request from the second electronic device to the first electronic device; and (D2) issuing the internet radio station type list from the first electronic device to the second electronic device, so that the plural type data corresponding to the plural radio station types are displayed on the second electronic device.

5. The real-time streaming media playing method according to claim 1, wherein the step (E) comprises sub-steps of:

(E1) selecting the first type data, and issuing a second internet radio station search request from the second electronic device to the first electronic device;

(E2) generating the playing list by the first electronic device according to the plural internet radio station data and plural address path data;

(E3) issuing the playing list from the first electronic device to the second electronic device; and (E4) displaying the plural internet radio station data corresponding to the first type data on the second electronic device according to the playing list.

6. The real-time streaming media playing method according to claim 1, wherein the first electronic device is a digital media server according to a DLNA protocol, the second electronic device is a digital media controller or a digital media player according to the DLNA protocol, and the third electronic device is a digital media renderer according to the DLNA protocol.

7. A real-time streaming media playing method, comprising steps of:

(A) allowing a first electronic device in an area network group to search an internet server on the Internet, and allowing the internet server to issue an internet radio station type list, an internet radio station list and plural address data to the first electronic device, wherein the internet radio station type list contains plural type data corresponding to plural radio station types, and the internet radio station list contains plural internet radio station data corresponding to plural internet radio stations;

(B) storing the plural type data, the plural internet radio station data and the plural address data into the first electronic device, and correlating the internet server with a virtual folder of the first electronic device;

(C) allowing a second electronic device in the area network group to be connected to the first electronic device through network connection, and allowing the virtual folder correlated with the internet server to be displayed on the second electronic device;

(D) selecting the virtual folder, so that the plural type data corresponding to plural radio station types are displayed on the second electronic device;

(E) selecting a first type data of the plural type data, wherein after the first type data is selected, a playing list is transmitted from the first electronic device to the second electronic device, so that the plural internet radio station data corresponding to the first type data are displayed on the second electronic device, wherein the playing list contains the plural internet radio station data and plural address path data corresponding to the plural internet radio stations; and (F) selecting a first internet radio station data of the plural internet radio station data, wherein after the first internet radio station data is selected, a first address data of the plural address data corresponding to a first internet radio station is acquired by the second electronic device according to a first address path data of the plural address path data corresponding to the first internet radio station, so that a real-time streaming media file corresponding to the first internet radio station is played by the second electronic device or a third electronic device in the area network group according to the first address data, wherein the step (F) comprises sub-steps of:

(F5) selecting the first internet radio station data of the plural internet radio station data, wherein after the first internet radio station data is selected, the second electronic device is connected to the first electronic device through network connection according to the first address path data of the playing list, wherein the first address path data corresponds to the first internet radio station;

(F6) issuing a first address data of the plural address data from the first electronic device to the second electronic device according to the first address path data, wherein the first address data corresponds to the first internet radio station;

(F7) issuing the first address data from the second electronic device to the third electronic device, so that the third electronic device is connected to the internet server through network connection according to the first address data; and (F8) issuing the real-time streaming media file corresponding to the first address data from the internet server to the third electronic device, and playing the real-time streaming media file corresponding to the first internet radio station by the third electronic device.

8. A real-time streaming media playing system, comprising:

an internet server containing plural radio station types and plural internet radio stations, and issuing an internet radio station type list, an internet radio station list and plural address data corresponding to the plural internet radio stations, wherein the internet radio station type list contains plural type data corresponding to the plural radio station types, and the internet radio station list contains plural internet radio station data corresponding to the plural internet radio stations; and an area network group connected to the internet server through network connection and playing the plural real-time streaming media files, wherein the area network group comprises:

a network router connected to the internet server through network connection and providing a network connection function;

a digital media server connected to the network router through network connection and connected to the internet server via the network router through network connection, wherein the digital media server receives the internet radio station type list, the internet radio station list and the plural address data, wherein the digital media server comprises a storage element and a controlling unit, wherein the plural type data, the plural internet radio station data and the plural address data are stored in the storage element, a virtual folder correlated with the internet server is created by the controlling unit according to the plural type data, the plural internet radio station data and the plural address data, and a playing list is generated by the controlling unit according to the plural internet radio station data and plural address path data corresponding to the plural address data; and an active control device connected to the network router through network connection and connected to the digital media server and the internet server via the network router through network connection, wherein the plural internet radio station data are displayed on the active control device according to the playing list, the plural address path data are acquired by the active control device according to the playing list, and the plural address data are acquired by the active control device according to the plural address path data, wherein when one of the plural internet radio stations is selected, the real-time streaming media file corresponding to the selected internet radio station is played by the area network group according to the plural address data, wherein after the plural type data, the plural internet radio station data and the plural address data are received by the digital media server, the plural type data, the plural internet radio station data and the plural address data are written into a metadata corresponding to the internet server by the controlling unit, and the virtual folder is correlated with the internet server according to a character data corresponding to the internet server.

9. The real-time streaming media playing system according to claim 8, wherein when a search request from the digital media server is received by the internet server through the network router, the internet server issues a response signal to the digital media server, so that the digital media server issues a first internet radio station type search request to the internet server, wherein when the first internet radio station type search request is received by the internet server, the internet server issues the internet radio station type list to the digital media server, so that the plural type data of the internet server are acquired by the controlling unit according to the internet radio station type list, wherein when a first internet radio station search request from the digital media server is received by the internet server, the internet server issues the internet radio station list to the digital media server, so that the plural internet radio station data of the internet server are acquired by the controlling unit according to the internet radio station list, wherein when an internet radio station address retrieve request from the digital media server is received by the internet server, the internet server issues the plural address data to the digital media server.

10. The real-time streaming media playing system according to claim 8, wherein when the active control device is connected to the digital media server via the network router through network connection and the virtual folder is selected, the active control device issues a second internet radio station type search request to the digital media server, and the controlling unit issues the internet radio station type list to the active control device, so that the plural type data corresponding to the plural radio station types are displayed on the active control device, wherein after a second internet radio station search request corresponding to a first radio station type of the plural radio station types is transmitted from the active control device to the digital media server, the controlling unit issues the playing list to the active control device, so that the plural internet radio station data corresponding to the first radio station type are shown on the active control device.

11. The real-time streaming media playing system according to claim 8, wherein the plural address data are acquired by the active control device according to the plural address path data, and the real-time streaming media file corresponding to the selected internet radio station is played by the active control device according to the plural address data, wherein the active control device is a digital media player, the area network group complies with a DLNA protocol, and the network router complies with a UPnP protocol.

12. The real-time streaming media playing system according to claim 8, wherein the area network group further comprises a digital media renderer, wherein the digital media renderer is connected to the network router through network connection and connected to the active control device, the digital media server and the internet server via the network router through network connection, wherein after the plural address data are acquired by the active control device, the active control device issues the plural address data to the digital media renderer, so that the real-time streaming media file corresponding to the selected internet radio station is played by the digital media renderer according to the plural address data, wherein the active control device is a digital media controller, the area network group complies with a DLNA protocol, and the network router complies with a UPnP protocol.

* * * * *